United States Patent

Hänsch

[11] Patent Number: 5,772,005
[45] Date of Patent: Jun. 30, 1998

[54] APPARATUS FOR CONVEYING ARTICLES

[75] Inventor: Egon Hänsch, Wetzikon, Switzerland

[73] Assignee: Ferag AG, Zurich, Switzerland

[21] Appl. No.: 644,002

[22] Filed: May 9, 1996

[30] Foreign Application Priority Data

May 9, 1995 [CH] Switzerland .................. 01342/95

[51] Int. Cl.[6] .................................................. B65G 17/28
[52] U.S. Cl. ................................................... 198/594
[58] Field of Search .................... 198/594, 778, 198/812

[56] References Cited

U.S. PATENT DOCUMENTS

| | | |
|---|---|---|
| 4,201,286 | 5/1980 | Meier . |
| 4,413,724 | 11/1983 | Fellner .................. 198/594 |
| 4,549,647 | 10/1985 | Cossé . |
| 4,718,656 | 1/1988 | Reist . |
| 5,413,213 | 5/1995 | Goltz et al. . |
| 5,490,589 | 2/1996 | Golz et al. .............. 198/594 |

FOREIGN PATENT DOCUMENTS

| | | |
|---|---|---|
| 0 259 650 | 8/1987 | European Pat. Off. . |
| 0 635 414 | 1/1995 | European Pat. Off. . |
| 1 262 886 | 3/1968 | Germany . |
| 2 307 728 | 9/1974 | Germany . |
| 26 18 905 | 11/1977 | Germany . |

Primary Examiner—Joseph E. Valenza
Attorney, Agent, or Firm—Bell Seltzer Intellectual Property Law Group of Alston & Bird llp

[57] ABSTRACT

A connecting conveyor (32) is arranged between a first conveyor (10) and a second conveyor (24) and comprises a carrier (30) which can be moved freely along the conveyors (10, 24). Arranged on the carrier (30) is a conveying member (35) which is intended to receive, at a transfer location (42) of the first conveyor (10), the articles fed by said first conveyor and to transport said articles to a receiving location (44) of the second conveyor (24). Mounted on the carrier (30) are two drive wheels (38, 38') which interact with respective ones of the conveyors (10, 24). In normal operation, the drive wheels (38, 38') are connected to one another so as to rotate together. In order to close or to form a gap between successive articles, one of the drive wheels (38, 38') is rotationally fixed by means of a blocking element (80), and the other drive wheel (38, 38') is free to rotate by virtue of the relevant coupling (82, 82') being disengaged.

11 Claims, 6 Drawing Sheets

APPARATUS FOR CONVEYING ARTICLES

BACKGROUND OF THE INVENTION

The present invention relates to an apparatus for conveying articles between two conveyors.

If articles are to be machined or processed in operating stations arranged one behind the other, it cannot always be ensured that all the operating stations operate with the same timing. It is often the case that individual operating stations have to be put temporarily out of operation or have to be operated at a different operating speed. Moreover, it is very often the case that the articles have to be fed to the processing stations in a specific formation. Consequently, one operating station is usually relieved of its charge by a first conveyor which is driven in time with said operating station, and the downstream operating station is supplied by means of a second conveyor which is driven in time with this operating station. A connecting conveyor is then arranged between said two conveyors and, in the manner of a buffer with variable storage contents, can allow for the different conveying speeds of the two conveyors.

An apparatus of this type is disclosed, for example, in EP-A-0 633 212 and in the corresponding U.S. patent application, Ser. No. 08/266,958. The first conveyor exhibits a stationary discharge location, at which the connecting conveyor receives the articles in order to feed the latter to a likewise stationary transfer location of the second conveyor. In this arrangement, the conveying length of the connecting conveyor is constant. However, the number of clamps which are located within said conveying length and by means of which the articles are transported one by one is different. The formation in which the articles, these being printed products, are transported by means of the first conveyor is destroyed in this arrangement.

The earlier CH Patent Application No. 00 450/95-7 discloses a further apparatus in which the discharge location of the first conveyor and the receiving location of the second conveyor are arranged in stationary manner. However, the conveying length of the connecting conveyor, which is designed as a belt conveyor, is variable in order, on the one hand, at the discharge location, to close gaps in the imbricated formation in which the articles, likewise printed products, are transported on the first conveyor, without influencing the second conveyor and, on the other hand, at the receiving location, to form gaps, if necessary, in the imbricated stream, without influencing the first conveyor, or in order to be able to allow for different conveying speeds of the first and second conveyors. The formation of the articles remains intact in the region of the connecting conveyor and, if there are no gaps which need to be closed, the formation corresponds precisely to that which the articles assume in the region of the first conveyor. On account of the variable conveying length, the construction of the connecting conveyor is complex and the buffer size is restricted.

EP-A-0 259 650 discloses an apparatus in which, in order to even out the distance between successive articles, printed products in the case in question, the conveying length of the first conveyor and the conveying length of the connecting conveyor are changed by the same amount in opposite directions. In the case of a stationary receiving location of the second conveyor, the position of the discharge location of the first conveyor can be changed. The connecting conveyor has to be driven at a considerably lower conveying speed than the first conveyor, with the result that, at the discharge location, the formation in which the products are transported by the first conveyor is destroyed. The conveying speed of the second conveyor is higher than that of the connecting conveyor, in order then to be able to transport the articles away in the desired formation. Said known apparatus requires the formation of the articles to be changed twice and likewise has a restricted buffer capacity.

An apparatus of the generic type which is designed for conveying rod-shaped or cylindrical articles transversely to the axial direction is known, for example, from DE-A-26 18 905. In the case of said apparatus, the conveying length of both the first and the second conveyors is variable, with the result that said two conveyors assume the buffer function. The formation of the articles is maintained.

The first and the second conveyor each exhibit an endless troughed belt which is guided around wheels. The two wheels of each conveyor are each connected to one another via a driven chain drive. A connecting conveyor designed as a troughed wheel is arranged between the two parallel conveyors. The troughed wheel is mounted in a rotatable manner on a carrier trolley, which can be displaced freely in the longitudinal direction of the conveyors, and is connected to the chain drives of the conveyors by means of a chain wheel. As a result, the troughed wheel always receives the articles at the speed specific to the troughed belt of the first conveyor and discharges said articles at the speed specific to the troughed belt of the second conveyor.

It is accordingly an object of the present invention to provide an apparatus of the generic type such that, while being of a simple construction, it can be used flexibly and versatilely.

SUMMARY OF THE INVENTION

The above and other objects and advantages of the present invention are achieved by the provision of an article conveying apparatus which comprises a first conveyor (10) which defines an article discharge location (42) and a second conveyor (24) which defines an article receiving location (44), the conveyors being positioned to run at the same distance (A) from each other along a common section (28). A connecting conveyor (32) is positioned between the discharge location (42) and the receiving location (44) and so as to be movable along the common section (28) of the conveyors, the connecting conveyor (32) including two drive wheels (38, 38') in interengagement with respective ones of the first and second conveyors. Also, a coupling means is provided for selectively (1) coupling the drive wheels so that they are rotatable together, such that the connecting conveyor moves in dependence on the speeds ($v_1$, $v_2$) of the two conveyors, and (2) rotationally fixing either one of the drive wheels while permitting the other of the drive wheels to freely rotate, such that the connecting conveyor moves with the conveyor to which the one drive wheel is rotationally fixed.

BRIEF DESCRIPTION OF THE DRAWINGS

The invention is explained in more detail hereinbelow with reference to the following schematic drawing, in which.

Detailed Description of the Preferred Embodiments

Figure 1:
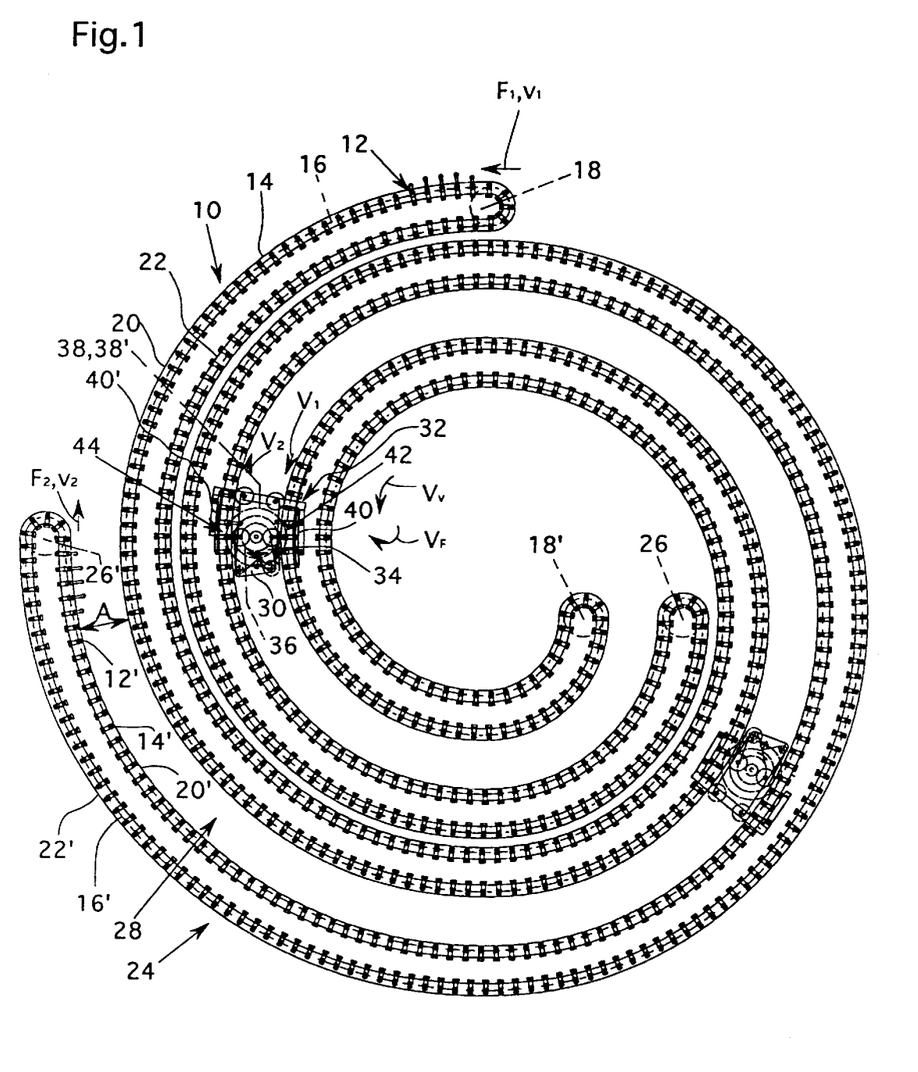
FIG. 1 shows a first embodiment of the apparatus according to the invention having conveyors designed as clamp conveyors, and a helical circulatory path, and having a connecting conveyor with a carriage-like carrier and a belt conveyor arranged thereon.

The apparatus shown in FIG. 1 exhibits a first conveyor 10 with individually controllable clamps 12 which are spaced apart one behind the other on an endless drawing member 16 which is guided in a guide profile 14 and is driven in circulation in the conveying direction F1. At the beginning and end of the first conveyor 10, the drawing member 16 is guided around a deflection wheel 18 and a drive wheel 18', respectively. From the deflection wheel 18, as seen in the conveying direction F1, the guide profile 14 which guides the active strand 20 of the drawing member 16 runs as far as the drive wheel 18' in the manner of a radially decreasing helix. In the region of the return strand 22, the guide profile 14 runs on the inner side of the active strand 20, as seen in the radial direction, and at a fixed distance therefrom.

A second conveyor 24 is of similar construction to the first conveyor 10 and likewise exhibits individually controllable clamps 12' which are spaced apart one behind the other on an endless drawing member 16'. The drawing member 16' is likewise guided in a guide profile 14', and it is guided around a deflection wheel 26 and a drive wheel 26' at both ends of the conveyor 24. The active strand 20', which is, then, located on the inside with respect to the return strand 22', as seen in the radial direction of the helix, runs from the inner deflection wheel 26 as far as the outer drive wheel 26', the same distance A with respect to the active strand 20 of the first conveyor 10. The two facing active strands 20, 20' of the two conveyors 10, 24 are thus arranged at the same distance from one another in a section 28 which, as seen in the conveying direction F1, begins at the drive wheel 26' and ends at the deflection wheel 26 and drive wheel 18', which are located on a radial with respect to the center of the helix. In this section 28, the conveying direction F1 of the first conveyor 10 runs counter to the conveying direction F2 of the second conveyor 24, as the correspondingly designated arrows show. A carrier 30 which is designed in the manner of a carriage and belongs to a connecting conveyor 32 is guided in a freely displaceable manner on the guide profiles 14, 14' assigned to the active strands 20, 20'. The connecting conveyor 32 is shown in a first position by solid lines and in a second position by chain-dotted lines. Likewise arranged on the carrier 30 is a belt conveyor 36 which is guided around a deflection roller 34, serves as a conveying member 35, is of a fixed conveying length and will be described in more detail with reference to FIG. 2. Furthermore, two drive wheels 38, 38' designed as chain wheels are mounted in a freely rotatable manner on the carrier 30, these drive wheels interacting with the drawing members 16 and 16', respectively, in order to displace the carrier 30 in the section 28 and to drive the belt conveyor 36.

Opening guides 40, 40' are likewise fastened on the carrier 30, these guides being intended to move those clamps 12, 12' of the two conveyors 10 and 24 which are running past the connecting conveyor 32 temporarily into the open position from the closed position, into which they are prestressed by spring action. Similar, but stationary, opening guides are arranged downstream of the deflection wheel 18, as seen in the conveying direction F1, and upstream of the drive wheel 26', as seen in the conveying direction F2, in order likewise to open the clamps 12, 12' temporarily.

The connecting conveyor 32 is intended to receive from the first conveyor 10, at a discharge location 42 of the same, the articles transported by means of the clamps 12 of the first conveyor 10 and to guide said articles around the deflection roller 34 by means of the belt conveyor 36 and to feed them to a receiving location 44 of the second conveyor 24, where they are seized by the clamps 12' and conveyed further in conveying direction F2. Since the discharge location 42 and receiving location 44 are defined by the position of the connecting conveyor 32, said locations are displaced together with the movement of the connecting conveyor 32.

In normal operation, the drive wheels 38, 38' ensure that the connecting conveyor 32 moves at a speed $v_v = (v_1 - v_2) \div 2$ in conveying direction F1, where $v_1$ and $v_2$, being the conveying speeds of the first and second conveyors 10, 24, respectively, in mutually opposite directions, are counted positively. Thus, if $v_1 = v_2$, the connecting conveyor 32 remains in the same position. If $v_1$ is greater than $v_2$, the connecting conveyor 32 moves in the direction of the inner end of the helix, and, if $v_2$ is greater than $v_1$, the connecting conveyor 32 moves in the opposite direction to this. It is thus the case that the conveying portion of the first conveyor 10 from the point at which the articles are received at the deflection wheel 18 by virtue of the clamps 12 being closed as far as the discharge location 42 and the conveying portion of the second conveyor 24 from the receiving location 44 as far as the point at which the articles are discharged at the drive wheel 26' by virtue of the clamps 12' being opened change in the same direction in dependence on the conveying speeds $v_1$ and $v_2$. Consequently, in the region of the section 28, the two conveyors 10 and 24 form a buffer of a variable length for the transported articles, the mutual positions thereof remaining unchanged.

Figure 2:
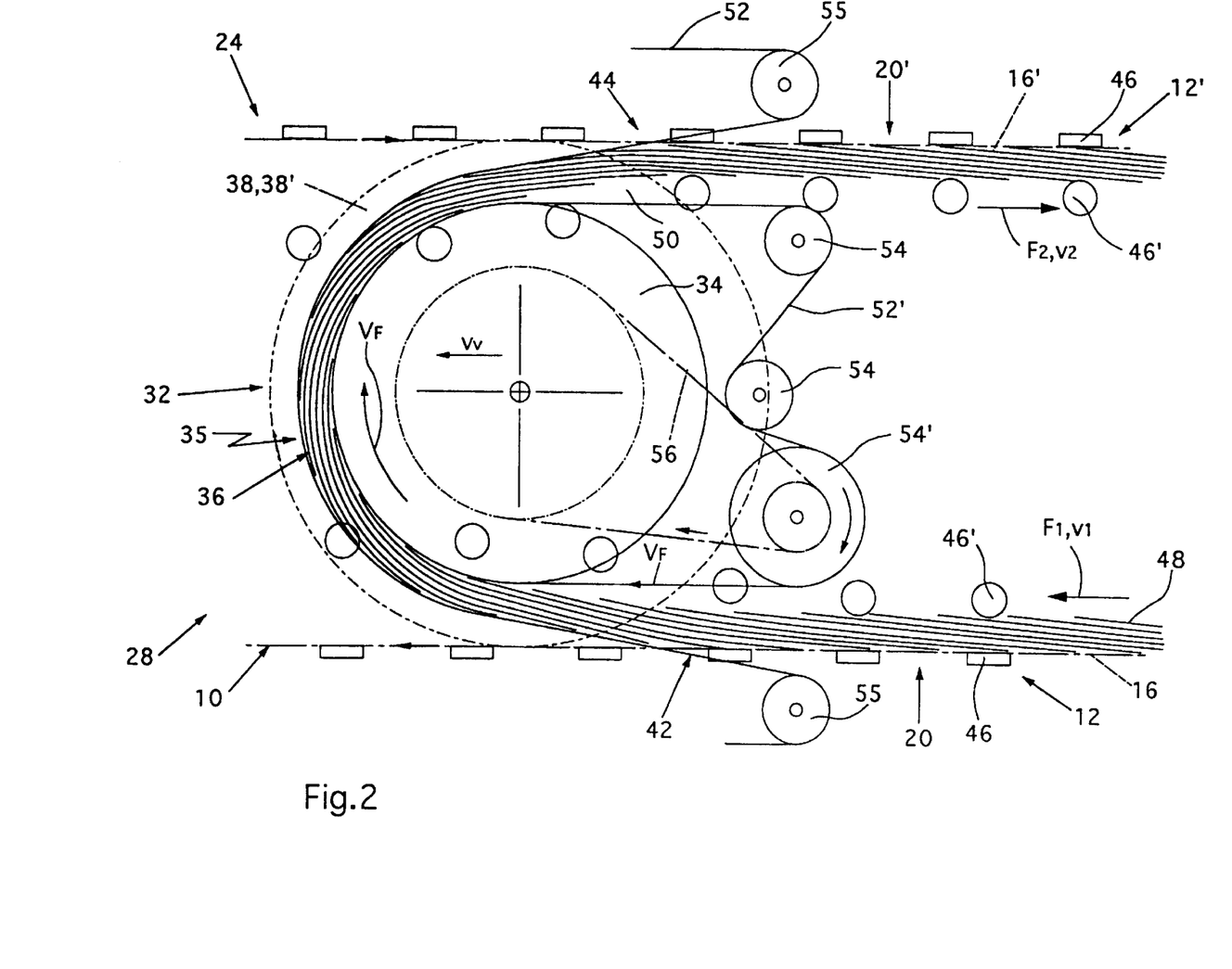
FIG. 2 shows, on an enlarged scale with respect to FIG. 1, the belt conveyor and part of each of the other conveyors.

FIG. 2 shows part of the drawing members 16, 16' with the clamps 12, 12' arranged thereon, these clamps exhibiting a fixed clamping jaw 46 and a movable clamping jaw 46' which interacts with said fixed clamping jaw. In the region of the conveying strands 20, 20', as far as the discharge location 42, as seen in the conveying direction F1, and from the receiving location 44, as seen in the conveying direction F2, the closed clamps 12 and 12', respectively, retain articles 48 which should be transported, in the present case sheet-like flexible products, for example printed products, which are arranged in an imbricated formation.

The belt conveyor 36 of the connecting conveyor 32 exhibits two continuous conveying belts 52, 52' which form a conveying gap 50 and are guided around the deflection roller 34 arranged between the conveyors 10 and 24. The conveying belt 52', which is located radially on the inside with respect to the deflection roller 34, is guided around deflection rollers 54 and a drive roller 54', these being arranged between the two conveyors 10 and 24, while the radially outer conveying belt 52 is guided around deflection rollers 55 which are arranged on the other side in relation to the active strands 20, 20' of the conveyors 10, 24 in order to form, on the side facing the first conveyor 10, an inlet into the conveying gap 50 for the articles 48 running in the conveying direction F1 and, on the side facing the second conveyor 24, a widening outlet. The articles 48 are thus deflected essentially through 1800 by means of the belt conveyor 36, while maintaining their mutual positions in the process.

In normal operation, the drive roller 54' is connected, via an indicated toothed-belt or chain drive 56, to the drive wheels 38, 38', the latter meshing with the drawing member 16 and 16', respectively, and having the deflection roller 34 mounted in a coaxial and freely rotatable manner with respect to them. In this arrangement, the conveying speed vF of the belt conveyor 36 is $(v_1+v_2)\div2$. As is described below, the connections between the drive wheels 38, 38' and the drive roller 54' can be disengaged.

Figure 3:
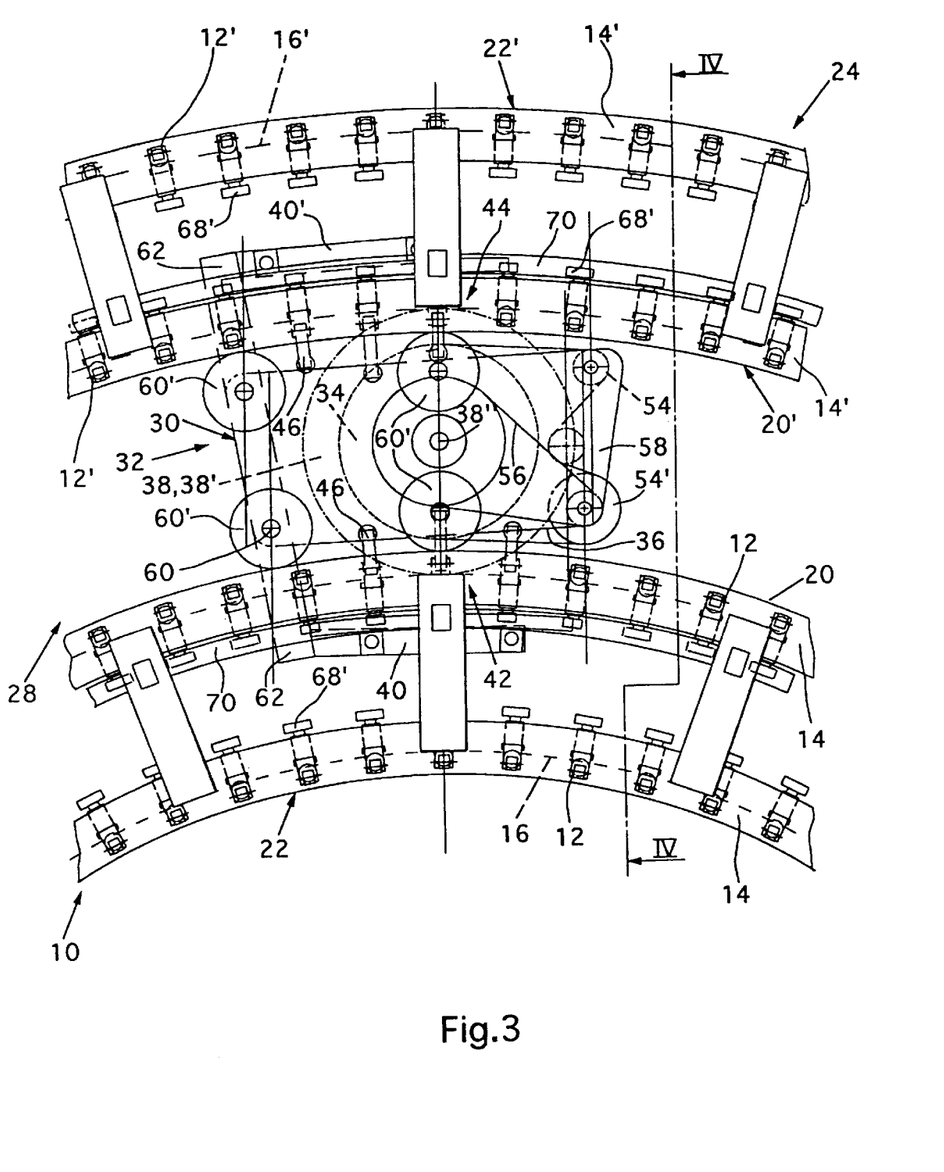
FIG. 3 shows, on an enlarged scale, a detail of FIG. 1.
Figure 4:
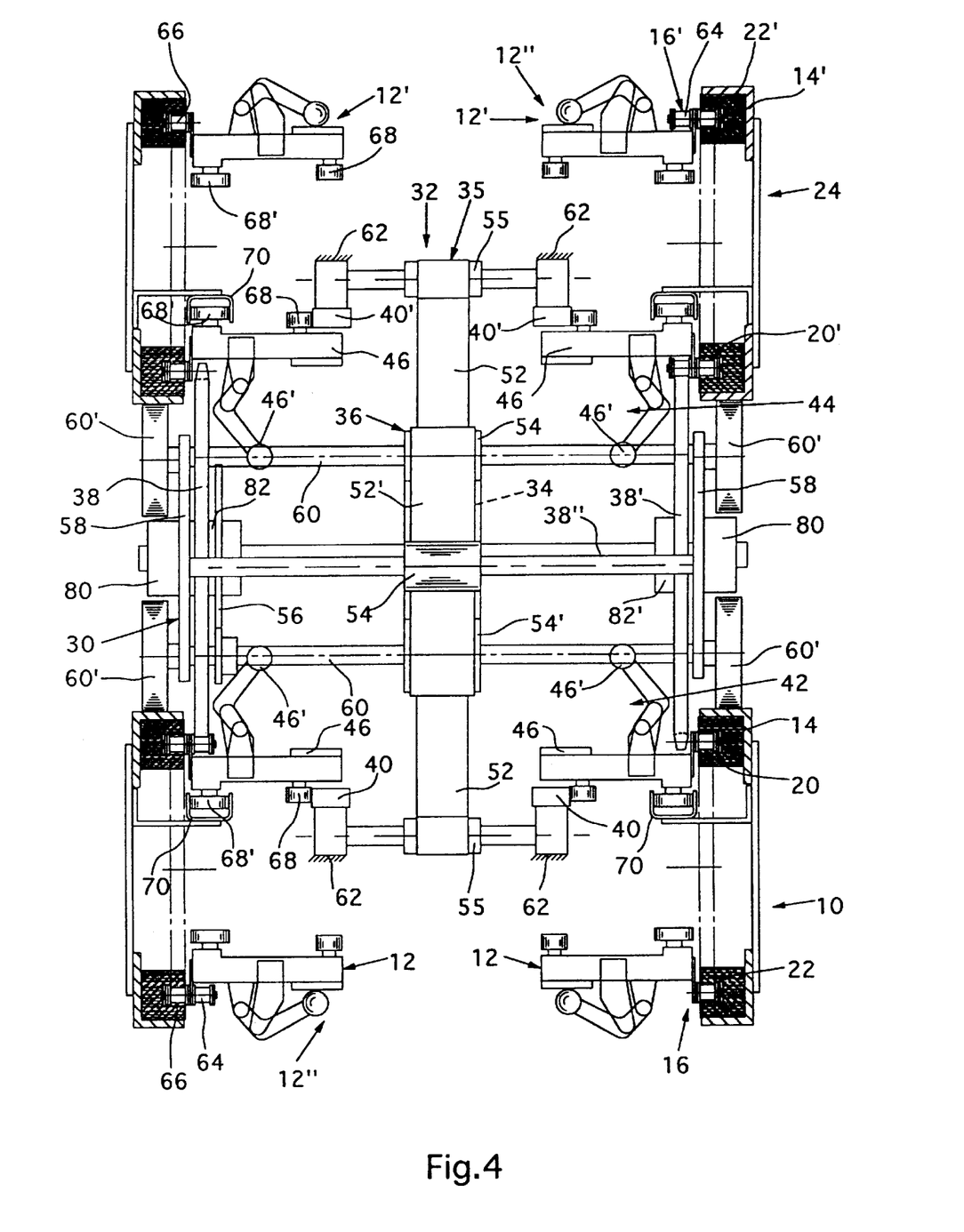
FIG. 4 shows a section along line IV—IV of FIG. 3.

As can be seen from FIGS. 3 and 4, the carrier 30 of the connecting conveyor 32 exhibits two parallel plates 58 on which the spindles for the deflection roller 54 and the drive roller 54' as well as the drive shaft 38", which bears the drive wheels 38, 38', are mounted in a freely rotatable manner. Furthermore, the two plates 58 are connected to one another via axles 60 on which running wheels 60' are mounted, the latter, for their part, being guided on the guide profiles 14, 14' of the first and second conveyors 10, 24. Furthermore, the plates 58 are connected to one another via a yoke 62 on which the opening guides 40, 40' for the clamps 12, 12' are fastened and the deflection rollers 55 are mounted in a freely rotatable manner.

Each drawing member 16, 16' comprises two chains 64 (duplex) which are guided in guide grooves 66, open toward one another, of the guide profiles 14, 14' and on which the fixed clamping jaw 46 of the clamps 12, 12' is fastened. The movable clamping jaws 46', which are prestressed into the clamping position, are mounted in a pivotable manner on the fixed clamping jaws 46. Said movable clamping jaws 46' are connected to a follow-on roller 68 which can be forced back counter to the action of a spring by the associated opening guide 40, 40' in order to open the clamps 12, 12'. In order to absorb the counter force, guide rollers 68' are mounted in a freely rotatable manner on the fixed clamping jaws 46, these guide rollers being guided in a cross-sectionally U-shaped guide channel 70 running along the active strand of the first and second conveyors 10, 24.

As can be seen particularly from FIG. 4, two mutually opposite clamps 12 and 12' form a clamp pair 12" for retaining the articles 48 which are to be transported, the belt conveyor 36 being arranged between the corresponding clamps 12, 12'.

The clamps 12 of a clamp pair 12" running onto the connecting conveyor 32 are opened by means of the opening guide 40 as soon as the articles 48 retained by said clamps 12 are located in the inlet of the conveying gap 50. In this arrangement, the movable clamping jaws 46' are displaced laterally outside the region of the articles 48, with the result that they can move past the articles 48 now deflected around the deflection roller 34. On the other hand, the clamps 12' of the second conveyor 24 are likewise opened before they run past the deflection roller 34 and are only closed in the region of the outlet of the conveying gap 50, in order to clamp the articles 48 and transport them further in the conveying direction F2.

A blocking member 80 designed, for example, as a coupling acts between the drive shaft 38" and plates 58, which blocking member is intended, on control commands, to connect the drive shaft 38" to the carrier 30 in a rotationally fixed manner or to allow said drive shaft to rotate freely with respect to said carrier. The drive wheels 38, 38' are each connected in a releasable manner to the drive shaft 38" via a coupling 82, 82'. The purpose and mode of functioning of the blocking member 80 and the couplings 82, 82' emerge from the description relating to FIGS. 5 and 6.

That embodiment of the apparatus which is shown in FIGS. 1 to 4 has a large buffer capacity, while requiring a small amount of space. Of course, it is also possible to design the first conveyor 10 and second conveyor 24 to run rectilinearly and in parallel and to overlap in the section 28.

Figure 5:
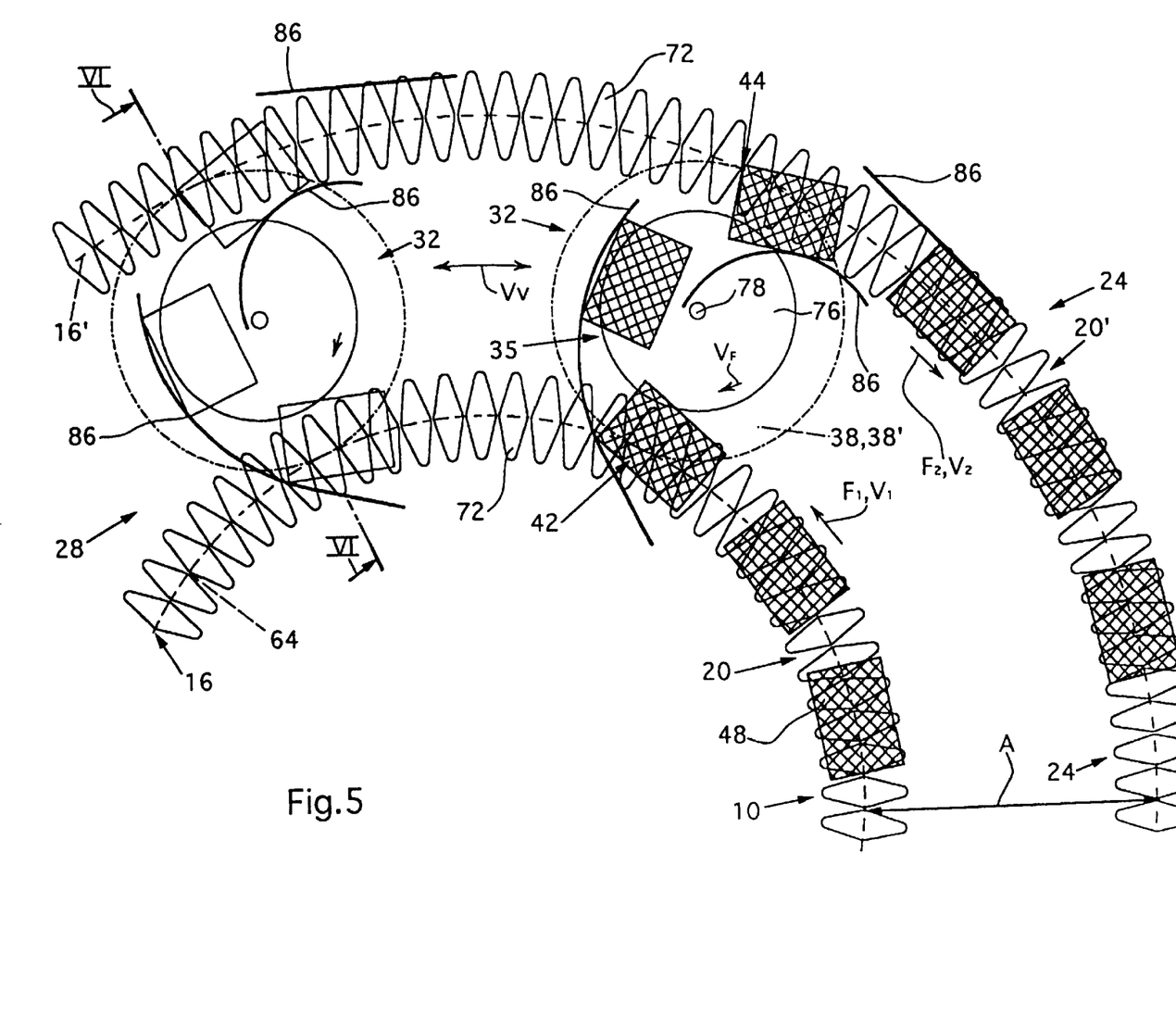
FIG. 5 shows a plan view of a second embodiment of the apparatus according to the invention having a disc-like connecting conveyor.
Figure 6:
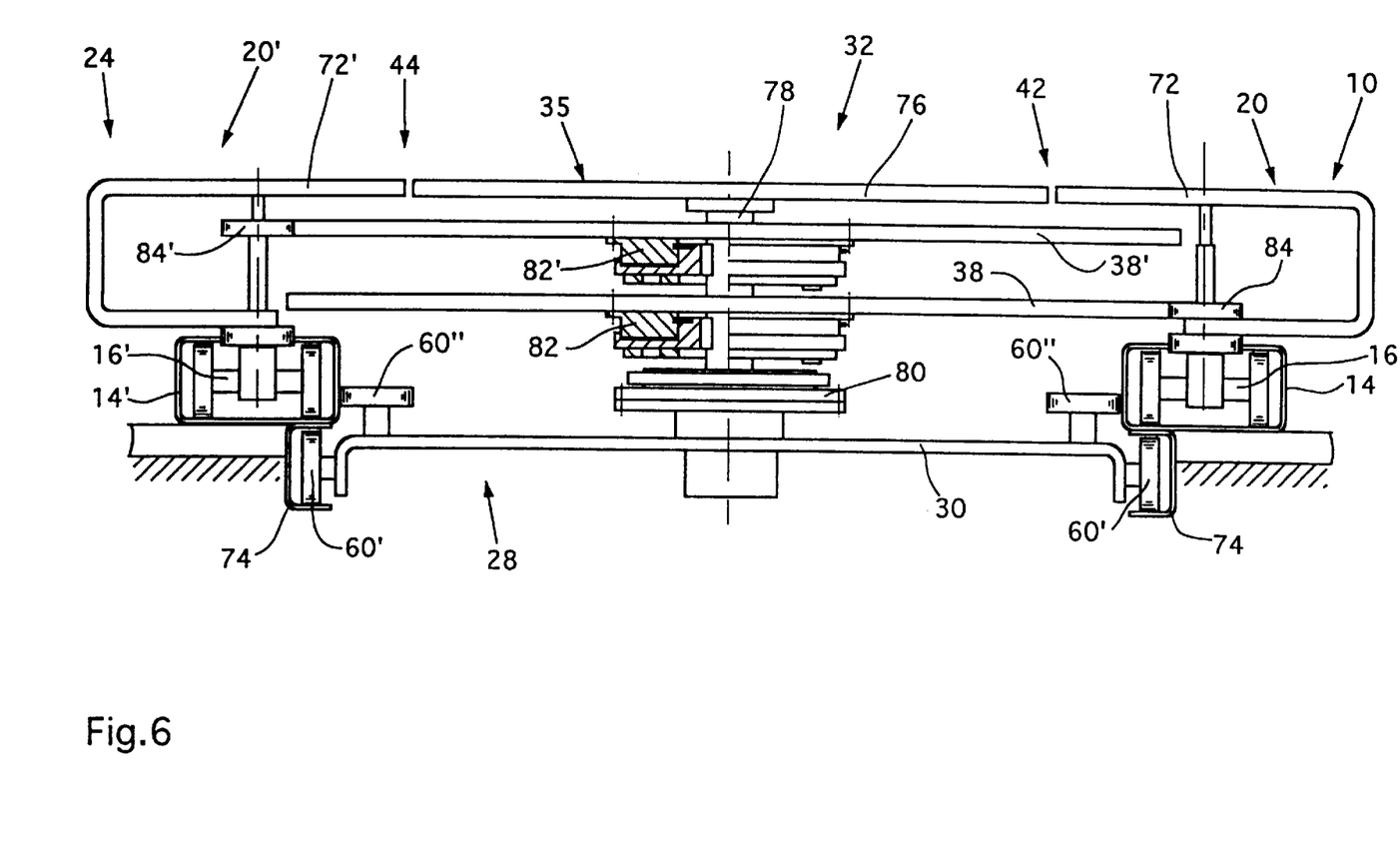
FIG. 6 shows a section along line VI—VI of FIG. 5.

In the case of that embodiment of the apparatus according to the invention which is shown in FIGS. 5 and 6, the first conveyor 10 and second conveyor 24 exhibit drawing members 16, 16' which are likewise designed as chains 64 and run at the same distance A from one another in the section 28. Approximately rhombic platforms 72 are fastened, at only a small distance one behind the other, on the drawing members 16, 16', which platforms are intended to transport articles 48 bearing on them, stacks of printed products in the present case.

As emerges, in particular, in conjunction with FIG. 6, the connecting conveyor 32 exhibits a carrier 30 which is designed as a carriage and is guided, by means of its freely rotatably mounted running wheels 60' and guide wheels 60", in C-shaped running rails 74 which are open toward one another and, respectively, on the outer roll of the cross-sectionally C-shaped guide profiles 14, 14', open toward the top, of the first conveyor 10 and second conveyor 24.

As conveying member 35, the connecting conveyor 32 exhibits a planar turntable 76 which is arranged between the platforms 72 and in the conveying plane determined by the latter and is fastened on a rotational shaft 78 which is mounted on the carrier 30 in a freely rotatable manner and runs in the vertical direction. A block member 80 designed, for example, as a coupling, acts between the rotational shaft 78 and the carrier 30, which blocking member is intended, on control commands, to connect the rotational shaft 78 to the carrier 30 in a rotationally fixed manner or to allow said rotational shaft to rotate freely with respect to said carrier. Mounted on the rotational shaft 78 in a freely rotatable manner are two drive wheels 38, 38' which are designed as chain wheels and can be connected in a rotationally fixed manner to the rotational shaft 78 via in each case one coupling 82, 82'. The first drive wheel 38 interacts with slave rollers 84 arranged on the drawing member 16 of the first conveyor 10, whereas the drive wheel 38' interacts with slave rollers 84' arranged on the drawing member 16' of the second conveyor 24.

It can further be seen from FIG. 5 that the one connecting conveyor 32, shown in two different positions, exhibits directing rails 86 which are fastened on the carrier 30 and are intended to deflect the articles 48 from the platforms 72 of the first conveyor 10 onto the turntable 76 and from the latter onto the platforms 72 of the second conveyor 24.

The mode of functioning during normal operation and during the formation and closure of the gaps will now be described in conjunction with FIGS. 5 and 6. The same applies to the embodiment shown in FIGS. 1 to 4. In normal operation, the blocking member 80 is disengaged and the couplings 82, 82' are engaged, with the result that the two drive wheels 38, 38' are connected firmly to the turntable 76. In this case, the connecting conveyor moves along the two conveyors 10 and 24, in the section 28, at the speed $V_{\nu=(v_1-v_2)\div2}$, as does the connecting conveyor 32 of the embodiment shown in FIGS. 1 to 4. Consequently, in dependence on the speeds $v_1$, $v_2$ of the conveyors 10 and 24, the discharge location 42 and the receiving location 44 are displaced simultaneously, the formation of the articles 48 being maintained. In this arrangement, the turntable 76 is driven at a rotational speed vF which, in relation to the radius of the drive wheel 38, is $(v_1+v_2)\div2$.

Should an article (or more than one article) be missing in the region of the first conveyor 10, this gap in the formation can be closed as follows. As soon as the article 48 directly preceding the gap, as seen in the conveying direction F1, has been transferred to the turntable 76, the latter is prevented from further rotation by virtue of the blocking member 80 being activated, and the coupling 82 is disengaged, with the result that the connecting conveyor 32 is then coupled firmly to the drawing member 16' of the second conveyor 24 via the drive wheel 38'. The connecting conveyor 32 is then moved along with the second conveyor 24, while the turntable 76 is at a standstill, until the discharge location 42 has been displaced to the article directly following the gap. This is sensed, for example, by means of a detector, as a result of which the blocking member 80 is then disengaged and the coupling 82 is engaged again. Once the gap has been closed, normal operation follows on again, as described above.

In a similar manner, it is possible to form gaps on the second conveyor 24. For this purpose, as soon as, in normal operation, the last article 48 directly preceding the gap which is to be formed has been fed to the platforms 72 of the second conveyor 24, the blocking member 80 is actuated again and the coupling 82' is then disengaged. Consequently, the connecting conveyor 32 moves along with the first conveyor 10, to be precise until such time as the desired gap size has been achieved. The blocking member 80 is then disengaged again and the coupling 82' is actuated, with the result that the articles 48 following the gap are then supplied to the second conveyor 24 in normal operation.

It is also possible to design the first and/or second conveyor as a belt conveyor. A connecting-conveyor embodiment which is particularly suitable for this is shown in FIG. 5.

In the drawings and specification, there have been set forth preferred embodiments of the invention, and although specific terms are employed, they are used in a generic and descriptive sense only and not for purposes of limitation.

That which is claimed is:

1. An apparatus for conveying articles comprising
   a first conveyor (10) which defines an article discharge location (42) and a second conveyor (24) which defines an article receiving location (44), said conveyors being positioned to run at the same distance (A) from each other along a common section (28),
   a connecting conveyor (32) positioned between the discharge location (42) and the receiving location (44) and so as to be movable along the common section (28) of the conveyors, said connecting conveyor (32) including two drive wheels (38, 38') in interengagement with respective ones of the first and second conveyors, and
   coupling means for selectively
      (1) coupling the drive wheels so that they are rotatable together, and such that the connecting conveyor moves in dependence on the speeds ($v_1$, $v_2$) of the two conveyors, and
      (2) rotationally fixing either one of the drive wheels while permitting the other of the drive wheels to freely rotate, such that the connecting conveyor moves with the conveyor to which the one drive wheel is rotationally fixed.

2. The apparatus as claimed in claim 1, wherein the connecting conveyor (32) comprises a carrier (30) which is mounted such that it can be moved freely along the first and second conveyors (10, 24) in the common section (28), and an article conveying member (35) mounted on said carrier for conveying articles from the discharge location to the receiving location, and wherein the two drive wheels (38, 38') are mounted on the carrier (30).

3. The apparatus as claimed in claim 2, wherein the two drive wheels (38, 38') are connected, in each case via a releasable coupling (82, 82'), to a drive shaft (38", 78) which is mounted on the carrier (30) and is connected to the article conveying member (35).

4. The apparatus as claimed in claim 3, wherein the drive wheels (38, 38') are mounted on the drive shaft (38", 78), and wherein the coupling means includes a releasable blocking member (80) positioned between said drive shaft and the carrier (30).

5. The apparatus as claimed in claim 1, wherein the first and second conveyors (10, 24) have a helical configuration along the common section (28).

6. The apparatus as claimed in claim 1, wherein the first and second conveyors (10, 24) each comprise an endless drawing member (16, 16') which is driven in circulation, and the drive wheels (38, 38') are in interengagement with the drawing members (16, 16').

7. The apparatus as claimed in claim 1, wherein at least one of the two conveyors (10, 24) comprises clamp pairs (12"), spaced apart one behind the other in the conveying direction (F1, F2), with individually controllable clamps (12, 12') which are spaced apart from one another transversely with respect to the conveying direction (F1, F2) and are adapted for retaining the articles (48), and further comprises two parallel, endless drawing members (16, 16') which are driven in circulation and on which the clamps (12, 12') are arranged, and the connecting conveyor (32) includes control elements (40, 40'), for actuating the clamps (12, 12'), and a conveying member (35) positioned to run between the clamps (12, 12') of the clamp pairs (12") in order to receive articles (48) from the clamps (12, 12') or to discharge articles (48) to them.

8. The apparatus as claimed in claims 1, wherein at least one of the conveyors (10, 24) comprises at least one platform (72) for transporting the articles, and the connecting conveyor (32) includes a conveying member (35), which is in the form of a turntable (76), and directing rails (86) for deflecting the articles (48) from the platform (72) onto the conveying member (35) or vice versa.

9. An apparatus for conveying articles comprising
   a first conveyor (10) which defines an article discharge location (42) and a second conveyor (24) which defines an article receiving location (44), said conveyors being positioned to run at the same distance (A) from each other along a common section (28),
   a connecting conveyor (32) positioned between the discharge location (42) and the receiving location (44) and so as to be movable along the common section (28) of the conveyors, said connecting conveyor (32) including two drive wheels (38, 38') coaxially mounted to a drive shaft (38", 78) and in interengagement with respective ones of the first and second conveyors, and
   coupling means for selectively
      (1) coupling both of said drive wheels to said drive shaft, with the drive shaft being freely rotatable, such that the connecting conveyor moves in dependence on the speeds ($v_1$, $v_2$) of the two conveyors, and
      (2) coupling either one of the drive wheels to the drive shaft, with the drive shaft being rotationally fixed with respect to the connecting conveyor, and with the other drive wheel being uncoupled from said drive shaft, such that the connecting conveyor moves with the conveyor which is in interengagement with said one drive wheel.

10. The apparatus as claimed in claim 1 wherein said connecting conveyor includes an article conveying member (35) for conveying articles from the discharge location to the receiving location.

11. The apparatus as claimed in claim 10 wherein said coupling means includes releasable blocking means (80) for rotationally fixing the drive shaft with respect to the connecting conveyor, and a releasable coupling (82, 82') between each drive wheel and said drive shaft.

* * * * *